US012715104B2

(12) United States Patent
Damian

(10) Patent No.: US 12,715,104 B2
(45) Date of Patent: Aug. 25, 2026

(54) PORTABLE MAGNETIC TOOL HOLDER ASSEMBLY

(71) Applicant: Ronny Damian, Houma, LA (US)

(72) Inventor: Ronny Damian, Houma, LA (US)

( * ) Notice: Subject to any disclaimer, the term of this patent is extended or adjusted under 35 U.S.C. 154(b) by 0 days.

(21) Appl. No.: 18/894,380

(22) Filed: Sep. 24, 2024

(65) Prior Publication Data

US 2026/0084282 A1 Mar. 26, 2026

(51) Int. Cl.
*B25H 3/04* (2006.01)
*A47B 81/00* (2006.01)

(52) U.S. Cl.
CPC ............... *B25H 3/04* (2013.01); *A47B 81/00* (2013.01)

(58) Field of Classification Search
CPC .............. B25H 3/04; B25H 3/06; A47B 81/00
See application file for complete search history.

(56) References Cited

U.S. PATENT DOCUMENTS

| | | | | | |
|---|---|---|---|---|---|
| 2,565,625 | A | * | 8/1951 | Phelon | A47G 21/14 211/1 |
| 2,697,804 | A | * | 12/1954 | Phelon | B25H 3/04 211/DIG. 1 |
| 3,994,465 | A | * | 11/1976 | Rudnitzky | A47G 23/0225 D6/535 |
| D259,314 | S | * | 5/1981 | Nordlund | D8/373 |
| 4,343,172 | A | * | 8/1982 | Nordlund | B25H 3/04 211/70.1 |
| 5,005,710 | A | * | 4/1991 | Hofer | B25H 3/04 D6/567 |
| 5,078,281 | A | * | 1/1992 | Johnson | B25H 3/06 211/DIG. 1 |
| 5,201,486 | A | * | 4/1993 | Holbrook | A47B 81/00 248/205.5 |
| D354,350 | S | * | 1/1995 | Pryor | D24/128 |
| 5,695,165 | A | * | 12/1997 | Moriarty | B01L 9/54 248/206.5 |
| 5,699,910 | A | * | 12/1997 | Kubat | B25H 3/06 206/373 |
| 5,806,822 | A | * | 9/1998 | Schulz | A61M 1/76 248/223.41 |
| 5,979,675 | A | * | 11/1999 | Moriarty | B01L 9/54 248/231.71 |

(Continued)

FOREIGN PATENT DOCUMENTS

| | | | | |
|---|---|---|---|---|
| FR | 2495531 A1 * | 6/1982 | H01F 7/0252 |
| KR | 101512954 B1 * | 4/2015 | H01F 7/00 |
| WO | WO0107209 | 2/2001 | |

*Primary Examiner* — Stanton L Krycinski

(57) ABSTRACT

A portable magnetic tool holder assembly includes a first tool holder and a second tool holder. The first tool holder includes a first base structure and a support panel attached to and projecting transversely from the first base structure and designed to hold tools and work materials. The first base structure includes a magnet and the support panel includes a slot designed to permit insertion of tools and work materials. The second tool holder includes a second base structure and a support bracket attached to and projecting transversely from the second base structure and designed to hold tools and work materials. The second base structure includes a magnet and the support bracket includes a pair of bracket arms and a crosspiece connecting ends of the bracket arms.

10 Claims, 7 Drawing Sheets

(56) References Cited

U.S. PATENT DOCUMENTS

| | | | | |
|---|---|---|---|---|
| 6,318,569 | B1 * | 11/2001 | Rothing | F16B 12/00<br>211/DIG. 1 |
| 6,641,099 | B1 * | 11/2003 | Lue | B25H 3/04<br>248/314 |
| D519,944 | S | 5/2006 | Ottens | |
| 7,506,770 | B2 * | 3/2009 | Rief | E04H 4/14<br>211/70.6 |
| 7,510,092 | B2 * | 3/2009 | Sholem | B25H 3/04<br>211/DIG. 1 |
| 7,641,058 | B2 * | 1/2010 | Silverman | B05B 15/62<br>211/66 |
| 7,798,336 | B2 * | 9/2010 | Shiao | B25H 3/04<br>211/DIG. 1 |
| 7,877,920 | B2 * | 2/2011 | Szuminski | A47B 81/005<br>109/51 |
| 8,292,242 | B2 | 10/2012 | Thompson | |
| 8,533,966 | B2 | 9/2013 | Mikhaylenko | |
| 8,985,335 | B1 * | 3/2015 | Fisher | B25H 3/06<br>206/557 |
| 8,991,801 | B2 | 3/2015 | Plaszewski | |
| 9,242,368 | B2 * | 1/2016 | Huang | B25H 5/00 |
| 9,596,930 | B2 * | 3/2017 | VanHeusden | A47B 96/025 |
| 10,293,478 | B2 * | 5/2019 | Grela | B25H 3/006 |
| 10,357,875 | B2 * | 7/2019 | Mefferd | B25H 3/04 |
| 10,702,984 | B2 * | 7/2020 | Greta | B25H 3/023 |
| 10,843,328 | B2 * | 11/2020 | Wacker | F16B 1/00 |
| 11,020,848 | B2 | 6/2021 | Macauda | |
| 11,618,132 | B2 | 4/2023 | Jenkins | |
| 11,660,739 | B1 * | 5/2023 | Coffey | E04G 5/003<br>206/373 |
| 11,731,258 | B2 * | 8/2023 | Eleftheriou | B25H 3/04<br>211/70.6 |
| 11,826,896 | B2 * | 11/2023 | Keller | B25H 3/04 |
| 11,986,944 | B1 * | 5/2024 | Kao | B25H 3/04 |
| 12,128,541 | B2 * | 10/2024 | Hurley | B25H 3/003 |
| 12,163,622 | B2 * | 12/2024 | Osborn | B25H 3/04 |
| 12,194,613 | B2 * | 1/2025 | Nair | B25H 3/04 |
| 12,305,783 | B1 * | 5/2025 | Lucas | F16L 3/1091 |
| 12,318,909 | B2 * | 6/2025 | Keller | B25H 3/04 |
| 12,467,316 | B1 * | 11/2025 | Vernon | E06C 7/006 |
| 2003/0038100 | A1 * | 2/2003 | Liu | B25H 3/06<br>211/90.01 |
| 2003/0222036 | A1 * | 12/2003 | Lacombe | B25H 3/003<br>211/70.6 |
| 2004/0084593 | A1 * | 5/2004 | Barfield | B25H 3/04<br>248/311.2 |
| 2005/0139741 | A1 * | 6/2005 | Yuen | A45C 11/20<br>248/311.2 |
| 2005/0218285 | A1 * | 10/2005 | Yorns | B25H 3/006<br>248/314 |
| 2007/0007156 | A1 * | 1/2007 | Wu | B65D 73/0064<br>206/349 |
| 2011/0114580 | A1 * | 5/2011 | Chen | B25H 3/04<br>211/70.6 |
| 2015/0034572 | A1 * | 2/2015 | Kao | B25B 13/06<br>211/13.1 |
| 2016/0016306 | A1 * | 1/2016 | Haddon | B25H 3/04<br>248/537 |
| 2016/0068333 | A1 * | 3/2016 | Yedikian | B25H 3/04<br>220/608 |
| 2016/0346904 | A1 | 12/2016 | Marshall | |
| 2017/0029171 | A1 * | 2/2017 | Wang | B25H 3/06 |
| 2017/0165830 | A1 * | 6/2017 | Vaughan | B25H 3/04 |
| 2018/0213905 | A1 * | 8/2018 | Gregorec | B65D 33/06 |
| 2023/0330833 | A1 * | 10/2023 | Keller | B25H 3/04 |
| 2024/0209883 | A1 * | 6/2024 | Clapp | B25H 3/04 |
| 2025/0009123 | A1 * | 1/2025 | Donlon | A47K 17/02 |
| 2025/0339950 | A1 * | 11/2025 | Clapp | B25H 3/04 |

* cited by examiner

PORTABLE MAGNETIC TOOL HOLDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tool holders and storage devices and more particularly pertains to a new portable magnetic tool holder assembly for providing users with a portable support that can be temporarily mounted to any metallic surface adjacent a work area to provide the user with a holder or shelf-like structure for tools and work materials of varying shapes and sizes. For example, welders often have to take their equipment to where the workpiece is located, rather than being able to bring the workpiece into a workshop or similar that has permanent tool shelves and hangers. In addition, welders have to use a variety of tools, such as welding devices, measuring tapes, marking thread, lights, air lines, and other equipment, as well as welding materials such as carbon steel and whips. The portable magnetic tool holder assembly provides support for such variety of tools and work materials that can be magnetically mounted on any metal surface with a strong and secure hold to effectively provide the user with a portable workshop. The portable magnetic tool holder assembly is useful for virtually any job that requires taking tools and work materials to different locations, such as painting, carpentry, general contracting, auto repair, heating and air conditioning, and others.

(2) Description of Related Art Including Information Disclosed Under 37 CFR 1.97 and 1.98

The prior art relates to tool holders and storage devices. The prior art, as best understood, does not disclose a portable magnetic tool holder assembly that includes a first tool holder and a second tool holder, wherein the first tool holder includes a first base structure and a support panel attached to and projecting transversely from the first base structure and designed to hold tools and work materials, the first base structure includes a magnet and the support panel includes a slot designed to permit insertion of tools and work materials, the second tool holder includes a second base structure and a support bracket attached to and projecting transversely from the second base structure and designed to hold tools and work materials. The second base structure includes a magnet and the support bracket includes a pair of bracket arms and a crosspiece connecting ends of the bracket arms.

BRIEF SUMMARY OF THE INVENTION

An embodiment of the disclosure meets the needs presented above in a portable magnetic tool holder assembly generally comprising a first tool holder and a second tool holder. The first tool holder includes a first base structure and a support panel attached to and projecting transversely from the first base structure and designed to hold tools and work materials. The first base structure includes a magnet and the support panel includes a slot designed to permit insertion of tools and work materials. The second tool holder includes a second base structure and a support bracket attached to and projecting transversely from the second base structure and designed to hold tools and work materials. The second base structure includes a magnet and the support bracket includes a pair of bracket arms and a crosspiece connecting ends of the bracket arms.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
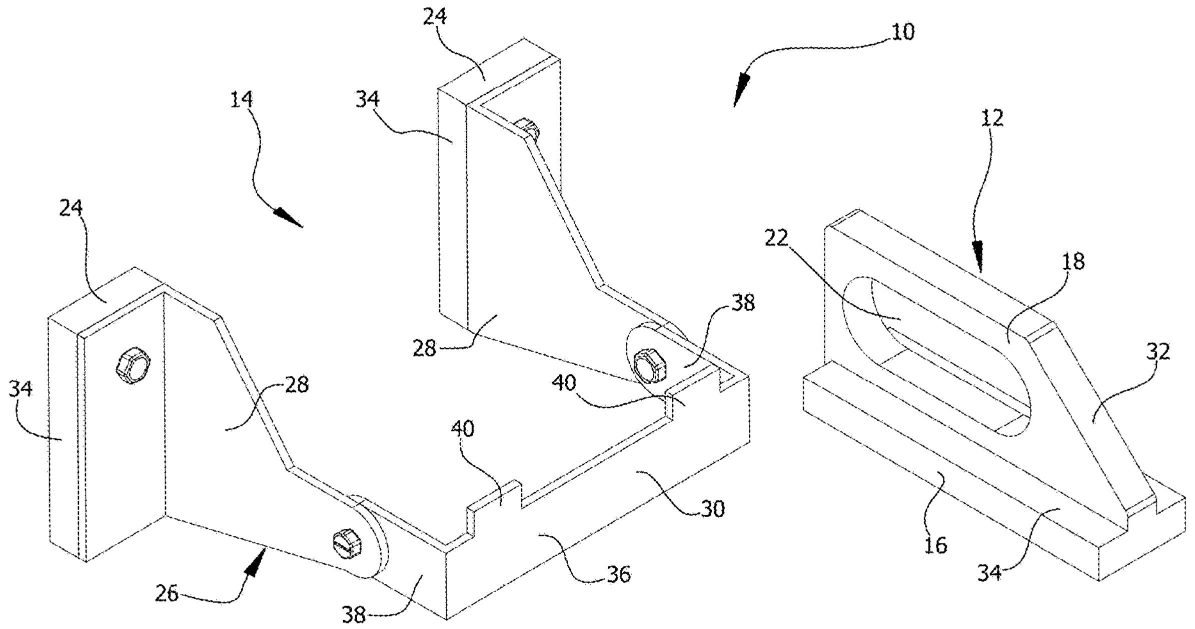
FIG. 1 is a perspective view of a portable magnetic tool holder assembly according to an embodiment of the disclosure.

With reference now to the drawings, and in particular to FIGS. 1 through 7 thereof, a new portable magnetic tool holder assembly embodying the principles and concepts of an embodiment of the disclosure and generally designated by the reference numeral 10 will be described.

As best illustrated in FIGS. 1 through 7, the portable magnetic tool holder assembly 10 generally comprises a first tool holder 12 and a second tool holder 14. The first tool holder 12, shown in FIGS. 1, 2, 3, and 7, includes a first base structure 16 and a support panel 18 attached to and projecting transversely from the first base structure 16 and designed to hold tools and work materials. The first base structure 16 includes a magnet 20 and the support panel 18 includes a slot 22 designed to permit insertion of tools and work materials. The second tool holder 14, shown in FIGS. 1, 4, 5, 6, and 7, includes a second base structure 24 and a support bracket 26 attached to and projecting transversely from the second base structure 24 and designed to hold tools and work materials. The second base structure 24 includes a magnet 20 and the support bracket 26 includes a pair of bracket arms 28 and a crosspiece 30 connecting ends of the bracket arms 28.

Figure 2:
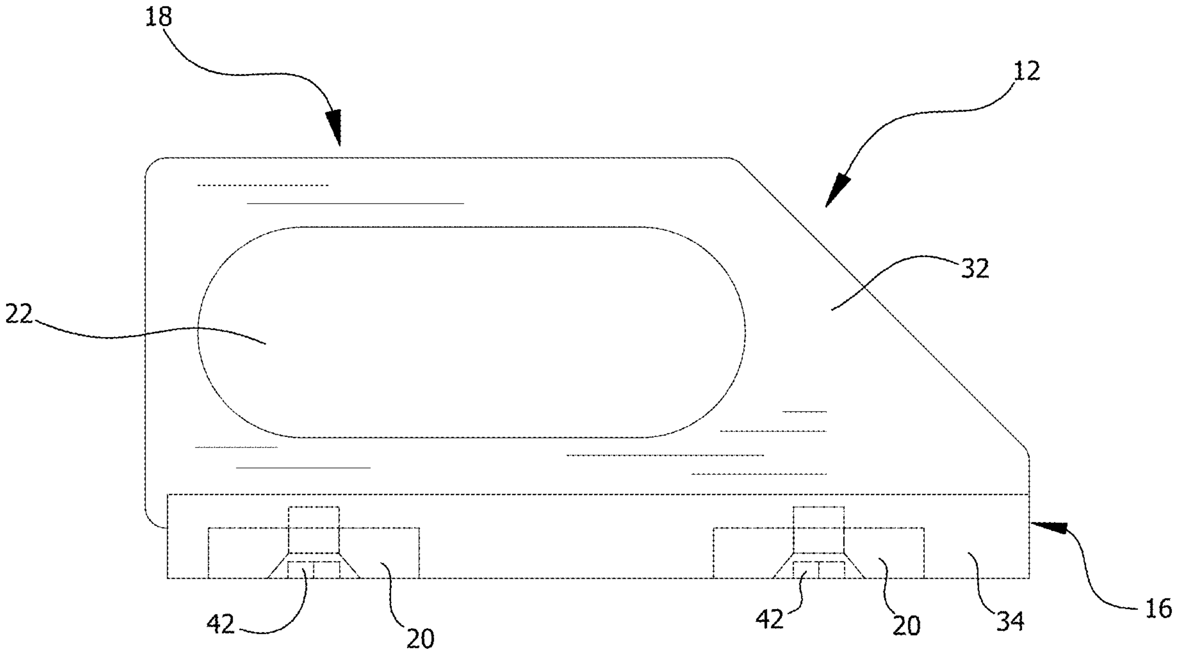
FIG. 2 is a side view of an embodiment of the disclosure.

The support panel 18, as shown in FIGS. 1 and 2, is in the form of a handle. The support panel 18 is substantially rectangular with a chamfered corner portion 32 and the slot 22 is partially rounded. In one possible embodiment, the support panel 18 could be other shapes, such as a square, or possibly rounded, or the chamfered corner portion 32 could be a complete corner. The slot 22 could be oval or circular, or possibly rectangular or square. The slot 22 could also be a customized shape with recesses or undulations to accommodate different tools and work materials.

Figure 3:
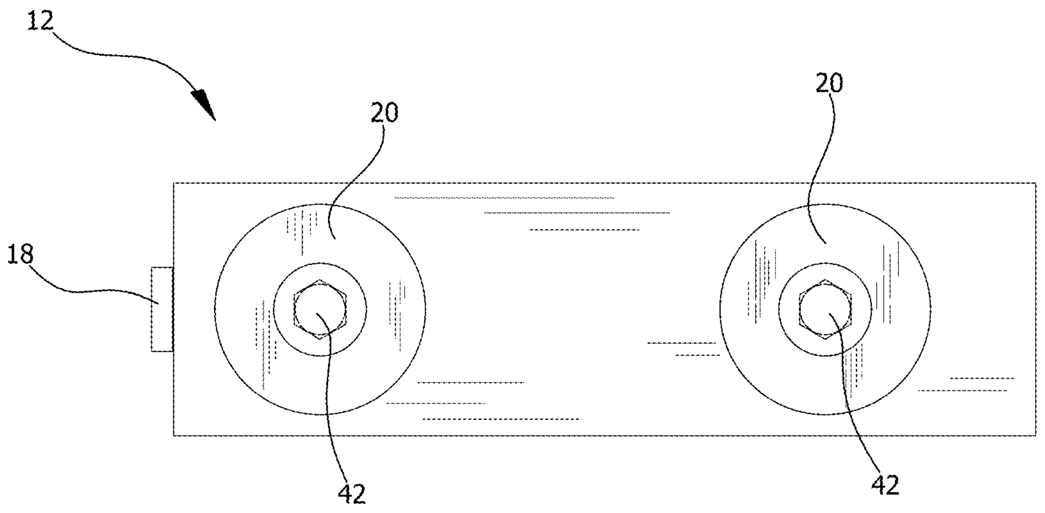
FIG. 3 is a rear view of an embodiment of the disclosure.

In the exemplary embodiment shown in FIGS. 2 and 3, the first base structure 16 includes a plate 34 and at least two magnets 20 mounted in the plate 34. More magnets 20 could be used, or possibly only one magnet 20. In another possible embodiment, the entire plate 34 could be magnetic. The magnets 20 are held in place by screws or bolts 42, or could be mounted by press fit or with adhesives. The first tool holder 12 is made out of metal, such as aluminum, iron, or steel. In at least one possible embodiment, the first tool holder 12 could be made of plastic, or a combination of metal and plastic.

Figure 4:
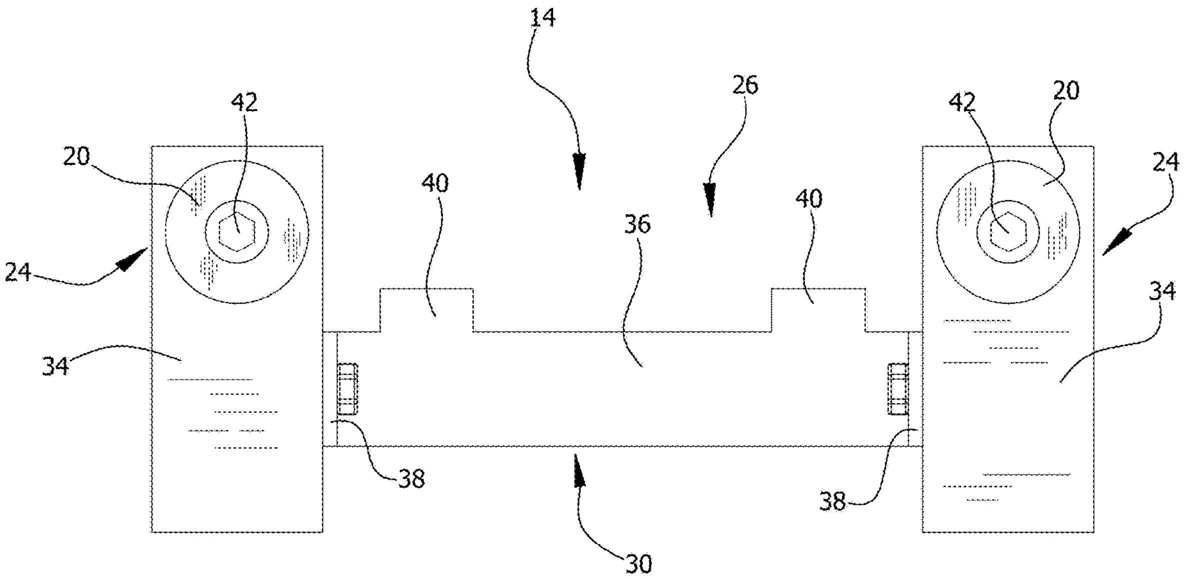
FIG. 4 is a rear view of an embodiment of the disclosure.
Figure 5:
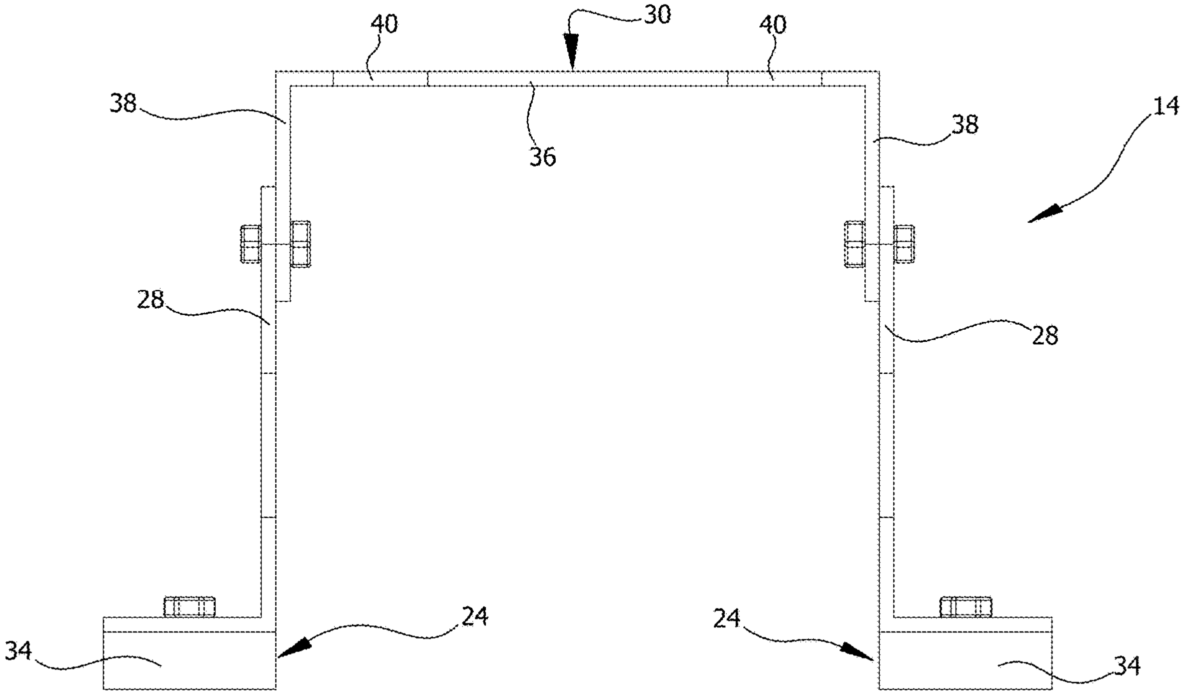
FIG. 5 is a top view of an embodiment of the disclosure.
Figure 6:
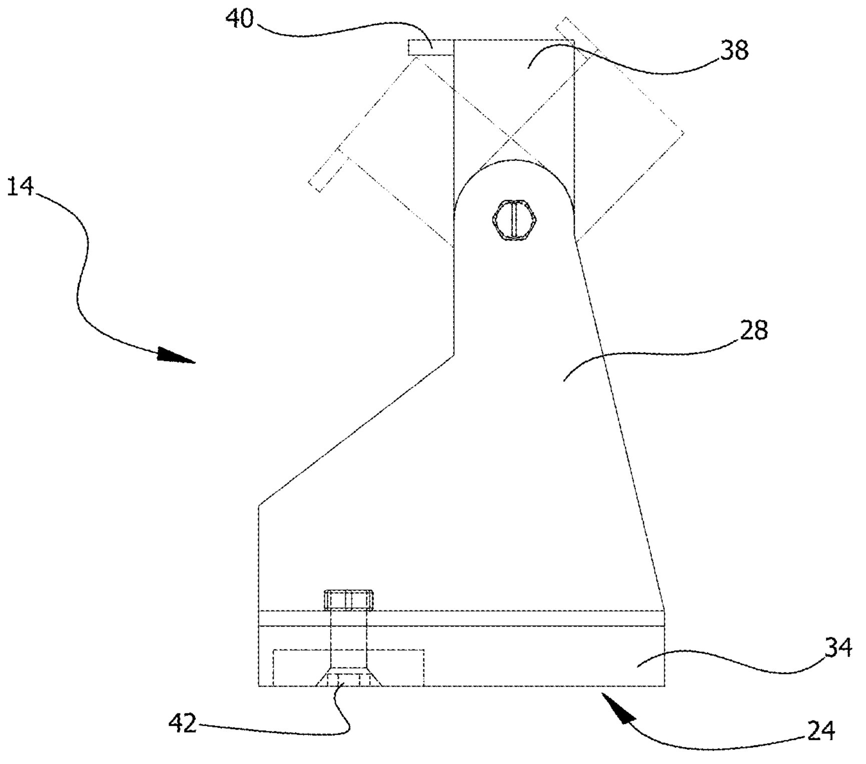
FIG. 6 is a side view of an embodiment of the disclosure.

With reference now to FIGS. 4, 5, and 6, the crosspiece 30 includes a main body 36 and two pivot arms 38 attached to and projecting transversely from opposite ends of the main body 36, one pivotably connected to each of the bracket arms 28. As shown in FIG. 6, the crosspiece 30 is selectively adjustable and temporarily fixable at different pivot angles to permit holding of tools and work materials of different sizes and configurations. The adjustability can be achieved by a screw that can be loosened to permit adjustment and tightened to fix the crosspiece 30 in place. Alternatively, the pivot arms 38 can be relatively tightly held to permit adjustment under increased force but resist movement after adjustment. Other pivotable connections, such as stepped or ratchet style connection, are within the scope of the disclosure.

In the exemplary embodiment, the crosspiece 30 includes a tab 40 projecting from the main body 36 for gripping and hanging of tools and work materials. As shown in FIG. 1, there are two tabs 40 that are rectangular or square, though other shapes and numbers of tabs 40 are within the scope of the disclosure.

Like the first base structure 16, the second base structure 24 includes a plate 34 and at least two magnets 20 mounted in the plate 34, which design can be modified as described above with respect to the first base structure 16. The second tool holder 14 includes a pair of the second base structures 24, one attached to each of the bracket arms 28. Like the first tool holder 12, the second tool holder 14 can be made of different kinds of metal, plastic, or a combination of metal and plastic.

In one possible embodiment, either the first tool holder 12 or the second tool holder 14 could be used by itself as a standalone unit.

Figure 7:
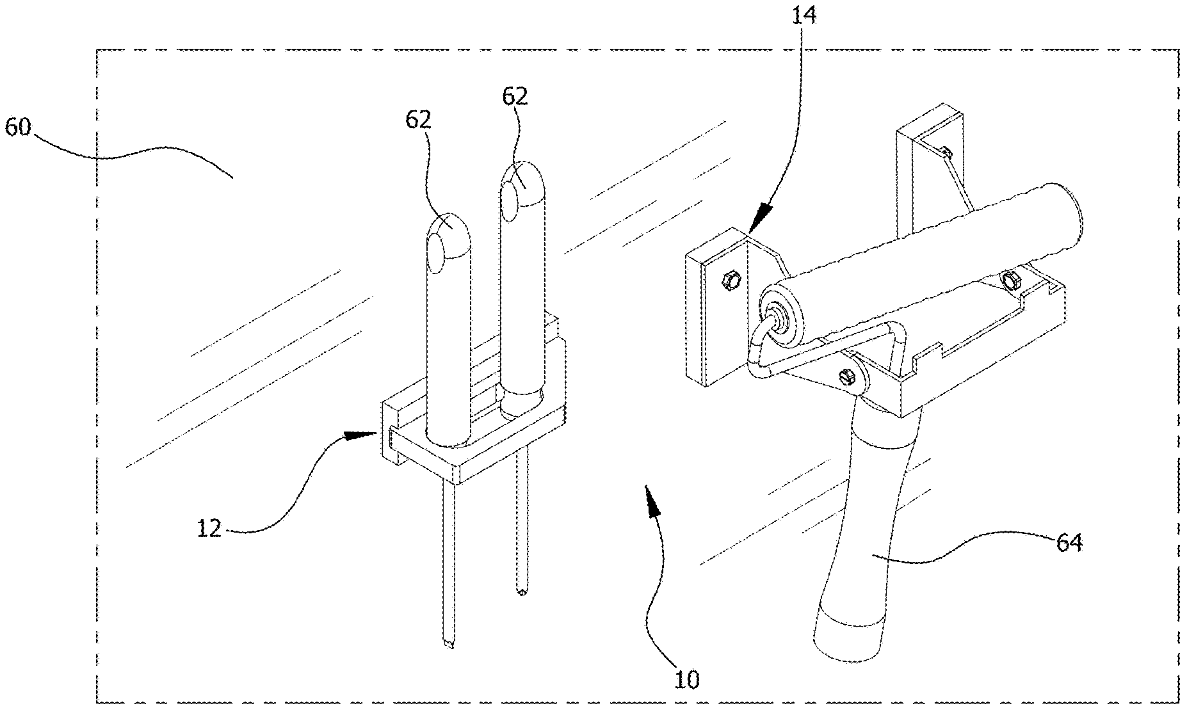
FIG. 7 is a perspective view of an embodiment of the disclosure in use.

FIG. 7 shows one possible use of the portable magnetic tool holder assembly 10. The first tool holder 12 and the second tool holder 14 have been temporarily and removably mounted on a surface, in this case a wall surface 60 that is made of a magnetic material, such as metal. The first tool holder 12 is holding a pair of screwdrivers 62, and the second tool holder 14 is holding a paint roller brush 64. However, these are merely examples of the many types of tools and work materials that could be supported or held by the portable magnetic tool holder assembly 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable magnetic tool holder assembly comprising:

a first tool holder comprising a first base structure and a support panel attached to and projecting transversely from said first base structure and configured to hold tools and work materials, said first base structure comprising a magnet and said support panel comprising a slot configured to permit insertion of tools and work materials; and a second tool holder comprising a second base structure and a support bracket attached to and projecting transversely from said second base structure and configured to hold tools and work materials, said second base structure comprising a magnet and said support bracket comprising a pair of bracket arms and a crosspiece connecting ends of said bracket arms;

wherein said support panel is substantially rectangular with a chamfered corner portion and said slot is partially rounded;

wherein said first base structure comprises a plate and at least two magnets mounted in said plate; and wherein said crosspiece comprises a tab projecting from said main body for gripping and hanging of tools and work materials.

2. The portable magnetic tool holder assembly of claim 1, wherein said support panel is in the form of a handle.

3. The portable magnetic tool holder assembly of claim 1, wherein said first tool holder comprises metal.

4. The portable magnetic tool holder assembly of claim 1, wherein said crosspiece comprises a main body and two pivot arms attached to and projecting transversely from opposite ends of said main body, one pivotably connected to each of said bracket arms.

5. The portable magnetic tool holder assembly of claim 4, wherein said crosspiece is selectively adjustable and temporarily fixable at different pivot angles to permit holding of tools and work materials of different sizes and configurations.

6. The portable magnetic tool holder assembly of claim 1, wherein said second base structure comprises a plate and at least two magnets mounted in said plate.

7. The portable magnetic tool holder assembly of claim 6, wherein said second tool holder comprises a pair of said second base structures, one attached to each of said bracket arms.

8. The portable magnetic tool holder assembly of claim 1, wherein said second tool holder comprises a pair of said second base structures, one attached to each of said bracket arms.

9. The portable magnetic tool holder assembly of claim 1, wherein said second tool holder comprises metal.

10. A portable magnetic tool holder assembly comprising:

a first tool holder comprising a first base structure and a support panel attached to and projecting transversely from said first base structure and configured to hold tools and work materials, said first base structure comprising a magnet and said support panel comprising a slot configured to permit insertion of tools and work materials;

a second tool holder comprising a second base structure and a support bracket attached to and projecting transversely from said second base structure and configured to hold tools and work materials, said second base structure comprising a magnet and said support bracket comprising a pair of bracket arms and a crosspiece connecting ends of said bracket arms;

wherein said support panel is in the form of a handle;

wherein said support panel is substantially rectangular with a chamfered corner portion and said slot is partially rounded;

wherein said first base structure comprises a plate and at least two magnets mounted in said plate;

wherein said first tool holder comprises metal;

wherein said crosspiece comprises a main body and two pivot arms attached to and projecting transversely from opposite ends of said main body, one pivotably connected to each of said bracket arms;

wherein said crosspiece is selectively adjustable and temporarily fixable at different pivot angles to permit holding of tools and work materials of different sizes and configurations;

wherein said crosspiece comprises a tab projecting from said main body for gripping and hanging of tools and work materials;

wherein said second base structure comprises a plate and at least two magnets mounted in said plate;

wherein said second tool holder comprises a pair of said second base structures, one attached to each of said bracket arms; and wherein said second tool holder comprises metal.

* * * * *